United States Patent [19]

Motrenec

[11] Patent Number: 4,558,878
[45] Date of Patent: Dec. 17, 1985

[54] ALL TERRAIN CYCLE WITH STEERING STABILIZER

[76] Inventor: Donald L. Motrenec, 410 11th St., Huntington Beach, Calif. 92648

[21] Appl. No.: 535,349

[22] Filed: Sep. 23, 1983

[51] Int. Cl.[4] .............................................. B62K 21/08
[52] U.S. Cl. .................................... 280/272; 188/317; 280/90
[58] Field of Search ................... 280/293, 272, 89, 90; 188/280, 282, 317

[56] References Cited

U.S. PATENT DOCUMENTS

| 1,935,521 | 11/1933 | Piotrowski | 280/89 X |
| 2,944,638 | 7/1960 | Rossman | 188/280 |
| 3,109,520 | 11/1963 | Vossiek | 188/282 |

FOREIGN PATENT DOCUMENTS 2710651  9/1978  Fed. Rep. of Germany ...... 280/272

Primary Examiner—John A. Pekar
Assistant Examiner—Charles R. Watts
Attorney, Agent, or Firm—Edgar W. Averill, Jr.

[57] ABSTRACT

An improved all terrain cycle having a single front steerable wheel mounted on a pivotable frame having a steering stabilizer affixed thereto. The steering stabilizer is a damper assembly which has a piston held within a fluid filled cylinder linked to the frame of the cycle at one end and to the frame of the steering assembly at the other end. The resulting cycle is much easier to control because rapid movement of the handlebars which occurs when the front wheel hits rough terrain is effectively eliminated.

6 Claims, 7 Drawing Figures

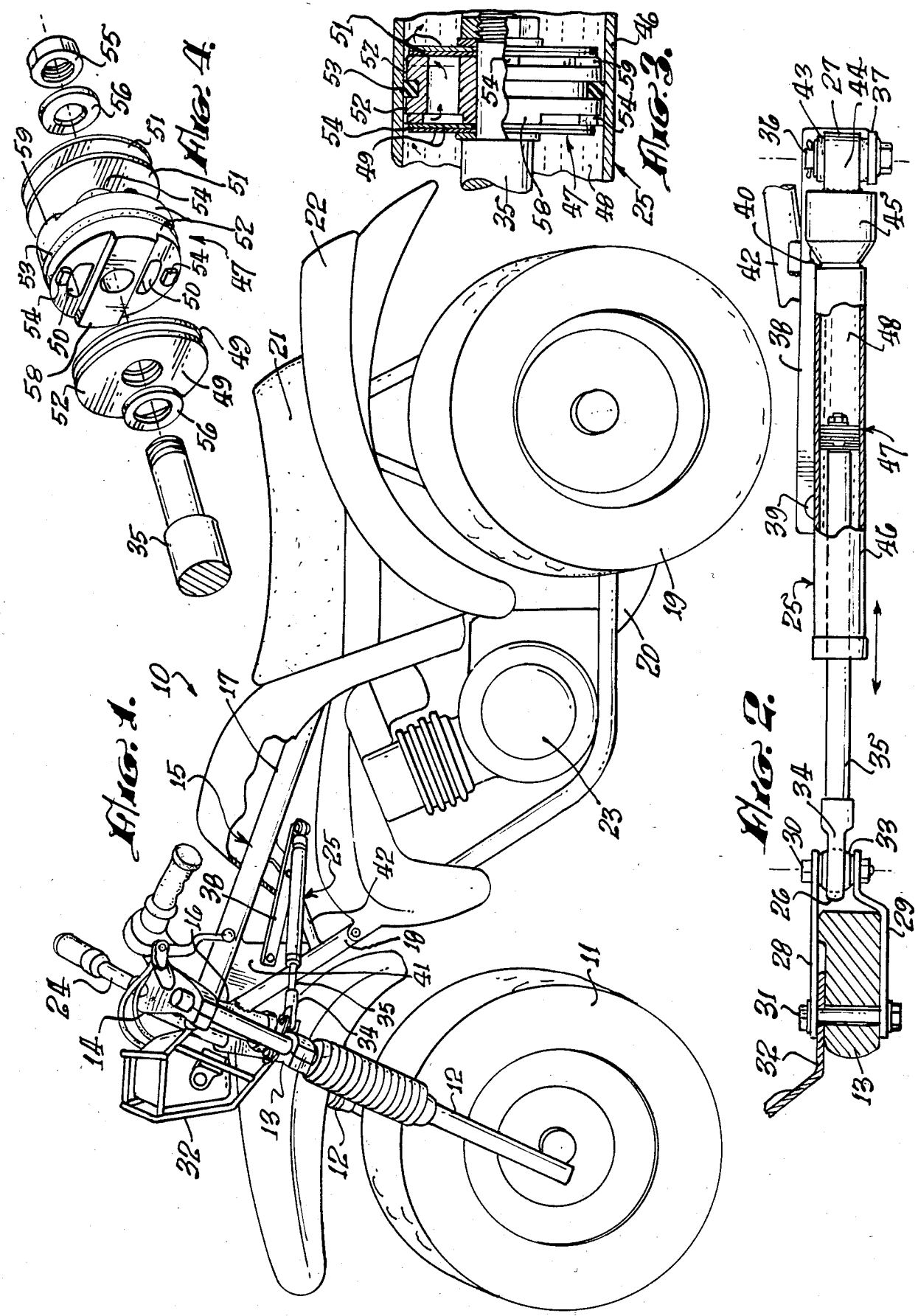

ALL TERRAIN CYCLE WITH STEERING STABILIZER

BACKGROUND OF THE INVENTION

The field of the invention is motor vehicles and the invention relates more particularly to three wheel motorcycles of the type commonly referred to as "all terrain cycles." Such cycles are designed for off the road use and are commonly used to travel across country where no roads exist or where the roads are in a very rough state and in need of repair.

Because of the nature of the terrain over which all terrain cycles are commonly used, there is a common problem relating to the control of such cycles over particularly rough terrain. Because such cycles are designed with a very wide front wheel, a turning force is created when the front wheel strikes an object which is located away from the center of the wheel. For instance, if the front wheel hits a large rock near the left edge thereof, the handlebars are moved rather strongly to the left. If the driver is inattentive, this can cause the handlebars to be turned rapidly to the left or completely dropped resulting in a loss of control and a safety hazard.

Furthermore, the continual effort to maintain the desired path while riding in rough terrain is both uncomfortable and tiring to the driver and there is a need for an all terrain cycle having improved steering control.

SUMMARY OF THE INVENTION

It is an object of the present invention to provide an all terrain cycle with improved steering properties.

The present invention is for an improved all terrain cycle of the type having a single front steerable wheel mounted on a pivotable frame which pivotable frame is held by the main frame of the cycle. The pivotable frame is turned by the movement of a pair of handlebars attached thereto. The improvement comprises a damper assembly having a piston held within a fluid-filled cylinder, the damper assembly being affixed at its first end to the pivotable frame at a distance of between three and a half and six inches from the axis of rotation of the pivotable frame and at the other end to the frame of the cycle. The point of connection at the frame of the cycle is near the vertical plane that contains the central longitudinal axis of the vehicle and in back of the axis of rotation of the pivotal frame. The point of connection to the frame is also near the imaginary plane which is perpendicular to the axis of rotation of the pivotable frame and which passes through the point of connection of the first end of the damper assembly.

BRIEF DESCRIPTION OF THE DRAWINGS

FIG. 1 is a perspective view of the all terrain cycle of the present invention.

FIG. 2 is an enlarged side view partly cut away of the steering stabilizer of the cycle of the present invention.

FIG. 3 is an enlarged view of the piston and a portion of the cylinder of the steering stabilizer of the cycle of the present invention.

FIG. 4 is an exploded perspective view of the piston of FIG. 3.

DESCRIPTION OF THE PREFERRED EMBODIMENTS

Figure 5:
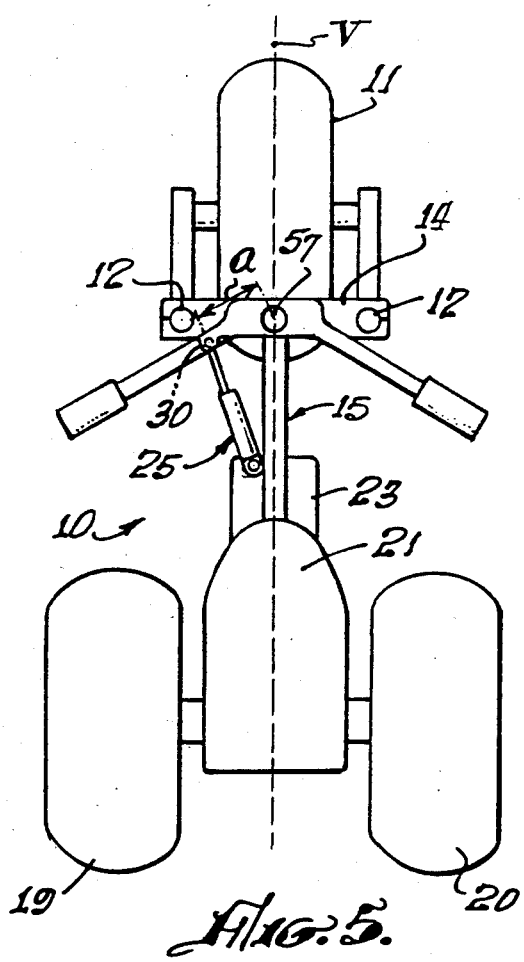
FIG. 5 is a top schematic view of the cycle of the present invention.

A motorized three-wheel cycle of the type commonly referred to as an "all terrain cycle" is shown in perspective view in FIG. 1 and indicated generally by reference character 10. The cycle has a front wheel 11 supported by a pair of front hydraulic forks 12. Front forks 12 are held by a pair of triple clamps 13 and 14.

The front wheel assembly is held to the frame 15 of the cycle by a shaft 57 held between triple clamps 13 and 14 which shaft is held securely in a collar 16 welded to the frame. Frame 15 is more specifically made up of a cross-bar 17 and a down tube 18 both of which are securely welded to collar 16. The rear wheels 19 and 20, seat 21, fender 22 and engine 23 make up the other major components of the cycle.

As pointed out above, front wheel 11 is deliberately made very wide so that the vehicle will have the ability to cross soft terrain without sinking in. The width of front wheel 10 can be seen clearly in FIGS. 5 and 6. Because of this width, the front wheel is prone to being involuntarily turned if an object is struck at a point near the right or left edge of front wheel 11. Striking such object then causes the handlebars 24 to move suddenly to the left or right. The result can occasionally force the handlebars out of the rider's grip and at the very least creates rider discomfort and fatigue when riding over rough terrain for an extended period of time.

While steering stabilizers have been used in some automobiles and trucks which have steering wheels, it had not been believed practical to use such stabilizers on handlebar controlled vehicles because it was believed that they would interfere with the control of the vehicle. It has been discovered, however, that by placing such stabilizer relatively near the axis of rotation of the steering shaft that the control of the cycle is not decreased in any way and yet the rider discomfort is almost entirely removed. Such a steering stabilizer is shown in FIG. 1 of the drawings and indicated by reference character 25 and shown in enlarged and partially cut away view in FIG. 2 of the drawings. The shaft end 26 is securely affixed to triple clamp 13 and the cylinder end 27 is affixed to the frame 15 of the all terrain cycle.

The shaft end 26 of stabilizer 25 is held by a pin 30 which is supported by a pair of mounting clamps 28 and 29 which in turn are held to triple clamp 13 by a bolt 31 which also holds a portion of headlight guard 32. The shaft end 26 of stabilizer 25 is mounted in a way to permit a certain amount of non-perpendicular movement of the stabilizer 25 with respect to pin 30. Thus, a ball 33 holds a socket member 34 which is affixed to shaft 35 of stabilizer 25.

Figure 7:
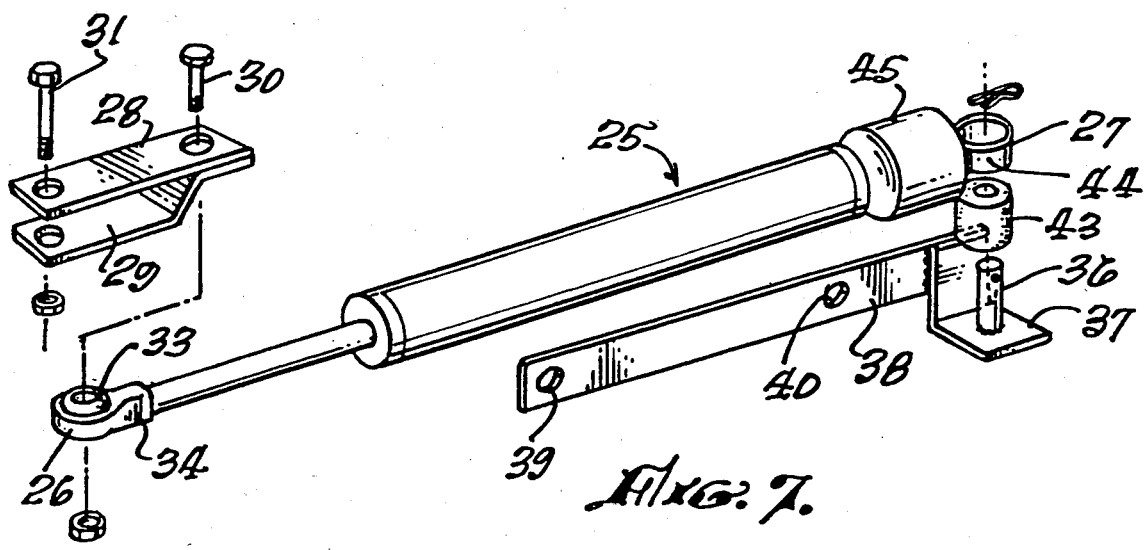
FIG. 7 is an exploded perspective view of the steering stabilizer of the cycle of the present invention.

The cylinder end 27 of stabilizer 25 is mounted rearwardly of the shaft end 26 and is also held by a pin which is indicated by reference character 36. Pin 36 is welded or otherwise affixed to arm 37 which in turn is welded to mounting plate 38 as shown most clearly in FIG. 7. Mounting plate 38 has a pair of holes 39 and 40 which permit it to be bolted or otherwise affixed to the frame of the cycle. The bolt which passes through hole 39 is held to plate 41 which is welded to cross bar 17, collar 16 and down tube 18 as shown in FIG. 1 of the drawings. The bolt which passes through hole 40 is held to cross bar 42 also shown best in FIG. 1.

The steering stabilizer 35 is mounted over pin 36 in a way which also permits a certain amount of perpendicular movement of the stabilizer with respect to the pin. This is accomplished by a rubber collar (see FIG. 7) which surrounds pin 36 and which in turn is surrounded by metal collar 44 welded to base 45 of stabilizer 25. Base 45 holds cylinder 46 in which piston 47 moves. Cylinder 46 is filled with a hydraulic fluid 48 which should be of a relatively low viscosity and which passes through the ports of piston 47 as described more in detail below.

The details of piston 47 are shown in cross-sectional view in FIG. 3 and in exploded view in FIG. 4. As can be seen in FIG. 3, the hydraulic fluid 48 passes around the periphery of disks 49, through ports 50 and around the periphery of disks 51 as the ported disk 52 moves along the cylinder. A rubber seal ring 53 prevents the flow of fluid along the outer surface of ported disk 52. Disks 49 and 51 are fabricated from a thin flexible metal such as phosphor bronze and the disks are held away from the entrance of ports 50 by a pair of ridges 58 and 59 and two pairs of protrusions 54 located on both sides of ported disk 52. The piston assembly 47 is held to shaft 35 by a nut 55 and the assembly is surrounded by a pair of washers 56.

This type of stabilizer prevents sudden movement by a flexing of disks 49 and 51. For instance, if front wheel 11 strikes a large rock on the left side, the front wheel assembly begins to move rapidly to the left, compressing stabilizer 25 and moving piston assembly 47 toward the cylinder end of stabilizer 25. This sudden movement causes disks 51 to flex inwardly toward the rear entrance of ports 50, greatly restricting the fluid flow through ports 50 and stopping the sudden movement of the front wheel assembly. After the object has been passed and the force of the left movement is reduced, disks 51 quickly return to their relaxed configuration, permitting the flow of fluid through ports 50 and the normal steering of the vehicle.

Figure 6:
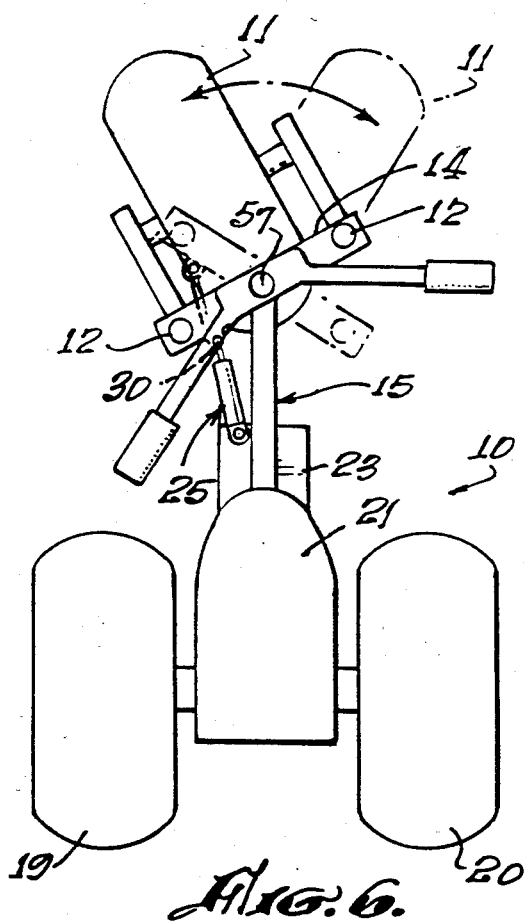
FIG. 6 is a top schematic view of the cycle of the present invention.

It is important that the steering stabilizer be mounted relatively close to the axis of rotation of the shaft 57 which is held in collar 16. In this way it does not have any significant effect on the normal turning of the handlebars by hand and also does not physically interfere with the rider. As shown in FIG. 5, the shaft end 26 of stabilizer 25 is held at a distance which is indicated by "a" from the axis of rotation of shaft 57. This distance should be at least three and one-half inches and no more than six inches for the proper combination of vehicle control and steering stabilization. Furthermore, such a mounting does not interfere with the rider during the turning of the vehicle. The movement of the steering stabilizer during turning is indicated in FIG. 6 where it can be seen that the shaft 35 goes from essentially full contraction during a left turn to essentially full extension during a full right turn. The preferred mounting of the shaft and of stabilizer 25 is about four and one-half inches from the center of shaft 57. Stabilizer 25 should be mounted so that it is relatively close to being at a right angle with respect to the axis of shaft 57. That is, it should lie near the plane which is perpendicular to shaft 57 so that the non-axial movement of stabilizer 25 is minimized. It need not be exactly in this plane, however, since the ball and socket mount at the shaft end and the rubber collar mount at the cylinder end can accept a certain amount of non-axial movement. The rearward end of stabilizer 25 is mounted near vertical plane "V" shown in FIG. 5, which plane includes the central longitudinal axis of the vehicle.

The result of the use of the steering stabilizer of the present invention is quite dramatic in riding in rough terrain. Sudden movements of the handlebars are essentially eliminated by the valving effect of the stabilizer and yet control of the vehicle is not hindered in any way. Rider fatigue is greatly reduced and safety is enhanced. The stabilizer may be mounted on either the right or left side of the vehicle and a stabilizer could be mounted on both sides for increased control although, of course, increased costs would result. One type of stabilizer which has been found particularly effective for use in the present invention has a cylinder inside diameter of seventh-eighths of an inch and a cylinder length of about seven inches. The shaft 35 was about eight and one-fourth inches from one end to the center of mounting pin 30. Ported disk 52 was about five-sixteenths of an inch thick and ridges 52 and 53 were about one-sixty-fourth of an inch in height.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved all terrain cycle of the type having a single front steerable wheel mounted on a pivotable frame, which pivotable frame is held by a main frame of the vehicle which pivotable frame is turned by the movement of a pair of handlebars wherein the improvement comprises:

a damper assembly having a piston held within a fluid filled cylinder, said damper assembly being pivotably connected at a first end to the pivotable frame at a distance between three and one-half and six inches from the axis of rotation of the pivotable frame and at a second end to the main frame of the vehicle at a point substantially rearward with respect to the first end and near the line of intersection of an imaginary vertical plane that includes a central longitudinal axis of the cycle and an imaginary plane which is perpendicular to the axis of rotation of the pivotable frame and which passes through the point of connection of the first end of the damper assembly.

2. The all terrain cycle of claim 1 wherein the first end of the damper assembly is connected at a point about four and one-half inches form the axis of rotation of the pivotable frame.

3. The all terrain cycle of claim 1 wherein the piston in said damper assembly is a ported disk having a flexible member held near an entrance to at least one of the ports thereof and positioned away from the entrance when there is no rapid flow of fluid into said port but which moves in front of said port when there is a rapid flow of fluid therethrough whereby sudden turning of the front steerable wheel is greatly retarded.

4. The all terrain cycle of claim 3 wherein the piston in said damper assembly has flexible members held near respective sides of the ported disk.

5. The all terrain cycle of claim 3 wherein said flexible member is a flexible disk.

6. The all terrain cycle of claim 4 wherein said flexible members are flexible disks.

* * * * *